(12) United States Patent
Samvelian

(10) Patent No.: US 10,375,046 B1
(45) Date of Patent: Aug. 6, 2019

(54) ANTI-SPAM AUTHENTICATION AND VALIDATION DEFENSE SYSTEM

(71) Applicant: Arsen Samvelian, Glendale, CA (US)

(72) Inventor: Arsen Samvelian, Glendale, CA (US)

( * ) Notice: Subject to any disclaimer, the term of this patent is extended or adjusted under 35 U.S.C. 154(b) by 492 days.

(21) Appl. No.: 15/000,897

(22) Filed: Jan. 19, 2016

Related U.S. Application Data

(60) Provisional application No. 62/105,661, filed on Jan. 20, 2015.

(51) Int. Cl.
*G06F 7/04* (2006.01)
*H04L 29/06* (2006.01)
*G06F 3/0488* (2013.01)

(52) U.S. Cl.
CPC ............ *H04L 63/08* (2013.01); *G06F 3/0488* (2013.01); *H04L 63/06* (2013.01)

(58) Field of Classification Search
CPC ........ H04L 63/08; H04L 63/06; G06F 3/0488
See application file for complete search history.

(56) References Cited

U.S. PATENT DOCUMENTS

| | | | |
|---|---|---|---|
| 6,965,992 B1* | 11/2005 | Joseph | H04L 63/0428 380/281 |
| 2011/0078444 A1* | 3/2011 | Jeong | H04L 63/126 713/170 |
| 2013/0310006 A1* | 11/2013 | Chen | H04W 12/04 455/411 |
| 2015/0124961 A1* | 5/2015 | Lambert | H04L 9/0861 380/44 |

* cited by examiner

*Primary Examiner* — Shewaye Gelagay
*Assistant Examiner* — Carlton Johnson
(74) *Attorney, Agent, or Firm* — Pejman Yedidsion; Brooks Acordia IP Law, PC

(57) ABSTRACT

Methods, devices, and systems for determining whether a received user generated response key matches the generated first unique key, thereby providing an autonomous authentication system to verify the user. The validation computing system may use a unique key to associate with each request for authentication from a client and further validate that unique key. Additionally, the authentication may be validated as an added security measure by a webhost.

16 Claims, 9 Drawing Sheets

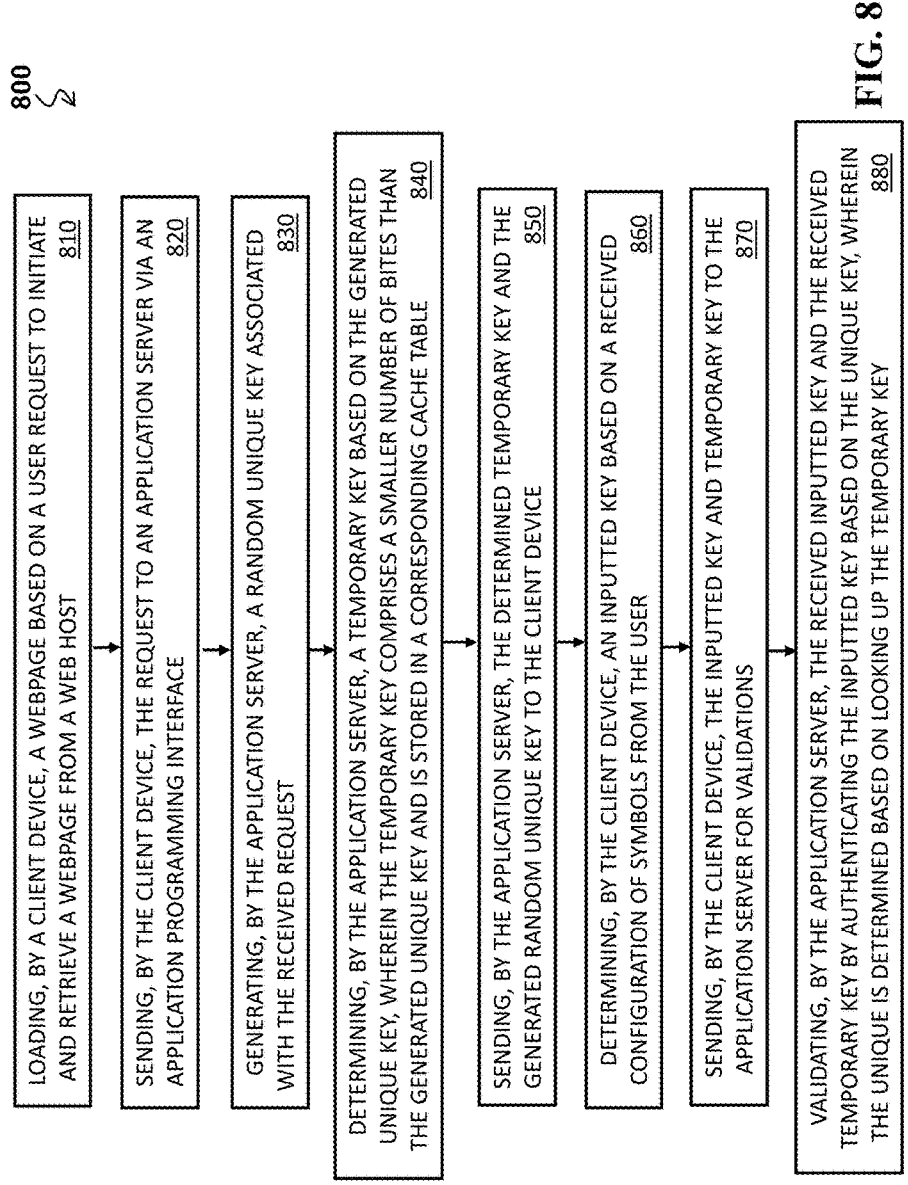

US 10,375,046 B1

ANTI-SPAM AUTHENTICATION AND VALIDATION DEFENSE SYSTEM

CROSS-REFERENCE TO RELATED APPLICATIONS

This application claims priority to and the benefit of Provisional Patent Application No. 62/105,661 filed Jan. 20, 2015, the contents of which, including all appendices, are hereby incorporated by reference herein for all purposes.

TECHNICAL FIELD OF ENDEAVOR

The field of the invention relates to computer related security, and more particularly, to methods and devices for testing—in computing—to determine whether a user is a human.

BACKGROUND

A computing system generally comprises one or more devices, for example, clients and servers, where the devices are in communication with each other, and one or more users. Effort has been put into helping systems determine whether actual users are ones navigating a communication medium between clients and servers or whether bots, i.e., robots that are an automated or semi-automated tool to carry out repetitive tasks on a computer, are responsible for such actions. Computer networks and servers are consistently under attack from hundreds of other computers and spammers using the aforementioned internet bots which may be applications running automated tasks over the Internet. Though useful, bots have predominately been used for unauthorized activities and with malicious intent.

Protection from these attacks may be by way of encryption schemes utilizing a test to determine the characteristics of a user in order to prevent Internet bots from committing fraudulent activities and what is termed "click fraud." Examples of such malicious bots are of the following types: spambots that collect email addresses from contact pages; downloader programs that draw bandwidth by downloading random web sites; web site scrapers that seize content of web sites and re-use the content without permission; viruses and worms; and Denial-of-service (DDoS) attacks. Safeguards have been put in place to protect from such malicious bots, however, these safeguards, or tests, may still be vulnerable to unauthorized packets and unauthorized entry of packets exchanged within a network, e.g., Internet or intranet. Additionally, some user identification procedures used to shield against such attacks has been developed but in recent years received countless criticisms. For example, current tests offered by computing devices to determine whether a user is a human lack certain clarity, where users may have their everyday work be slowed down because of the display of distorted words that are illegible and hard to decipher even by human beings.

SUMMARY

Exemplary device embodiments may comprise: a processor and an addressable memory, the processor configured to: receive a request from a client for a unique key; generate the unique key associated with the request received from the client; generate a second key, where the second key has a data length that is less than a data length of the unique key, where the data length is measured in bits; associate the generated second key with the generated unique key; send the generated unique key and the generated second key to the client based on the received request; receive the response to the unique key from the client, the response based on user input; perform steps of authenticating the received response with the unique key, where the steps of matching the received response comprise: if the received response matches the unique key, then validate the client for the received request; if the received response does not match the unique key, then reject the received request from the client. Optionally, the request may further comprise information regarding the display interface capabilities of the client; and, the information regarding the display interface capabilities of the client may comprise at least one of: whether the display may be a touch screen, whether the display requires a tactile keyboard, and whether the display requires a mouse for input. In one embodiment, the data length of the generated unique key and the generated second key is measured in bits. In another embodiment, the response to the unique key from the client may be further based on user input received from a user interface device; and the user interface device may comprise a touch screen input module.

Additionally, the device may be further configured to perform steps of authenticating the received response with the unique key, where the steps of matching the received response comprise: if the received response matches the unique key, then validate the client for the received request; where the validating the client may further be based on receiving a request from a webhost to verify that the client has already been authenticated via authenticating the received response with the unique key. Optionally, the receiving a request from the webhost to verify that the client has already been authenticated may further comprise checking a flag previously set and associated with the unique key to indicate a prior successful authentication; and the unique key may be generated based on a randomization scheme.

Exemplary system embodiments may comprise: a first computing device having a processor and an addressable memory, a visual display interface; and a user interface comprising at least one of: a tactile responsive component; an electromechanical radiation responsive component; and an electromagnetic radiation responsive component; a second computing device having a processor and an addressable memory; and a third computing device having a processor and an addressable memory; where each computing device may be in communication with the other computing devices via a plurality of communication channels; where the first computing device may be configured to: load a form comprising fields requiring input from a user; transmit, to the second computing device, a request for validation of the user; where the second computing device may be configured to: receive the request for validation of the user from the first computing device; generate a first unique key; generate a second unique key, where the second unique key has a data length that is less than a data length of the first unique key, and where the data length is measured in bits; and transmit the generated first unique key and the generated second unique key, to the first computing device, where the transmission of first unique key may be via transmitting pieces of the generated first unique key in randomized order; where the first computing device may be further configured to: determine a user generated response key based on user input received from the user interface; and transmit the determined user generated response key and the received second unique key to the second computing device; and where the second computing device may be further configured to: authenticate the user based on comparing the received user generated response key with the generated first unique key;

where the comparison may be further based on searching for the generated first unique key in a data store via using the second unique key as a lookup token; and determine whether the received user generated response key matches the generated first unique key, thereby providing an autonomous authentication system to verify the user.

Additionally, the second computing device may be further configured to: send the determination of whether the received user generated response key matches the generated first unique key to the first computing device; where the third computing device, via a webhost, may be configured to: receive from the first computing device the determination as to whether the received user generated response key matches the generated first unique key; validate the authentication where the validation may be via transmission, to the second computing device, the user generated response key and indicate that it was previously authenticate; determine whether the authentication may be validated based on receiving a flag from the second computing device, in response to the transmission indicating a successful transaction.

BRIEF DESCRIPTION OF THE DRAWINGS

Embodiments are illustrated by way of example and not limitation in the figures of the accompanying drawings, and in which:

FIG. 7A illustrate an exemplary table of attempts for clients by the system;

FIG. 7B illustrate an exemplary table of requests received for clients by the system; and FIG. 8 depicts, in a top-level flowchart, an exemplary method of implementation of the validation computing system.

DETAILED DESCRIPTION

Computing devices that are in communication with other computing devices, via a network, may employ a form of challenge-response verification where the security of one of the computing devices is based on the verification of the other computing devices. The verification may take the form of a number of different protocols in which one computing device presents a question (or "challenge") and another computing device which must then provide a valid answer (or "response") in order to be verified. The same verification may also be used to ensure one computing device is not being driven by a bot and that a set of challenge-response verification is performed to determine that the user driving the computing device is a human being. One way to prevent bots from creating automated spam posts is to require the poster to confirm their intention to post or in general, send out traffic to a network, via providing a set of entries that require human interaction. In addition, cryptographic solutions involving authentication of communication channels may be employed for security verification of users and added as another layer to the verification of computing devices. In an exemplary embodiment, an application programming interfaces (API) may most commonly be used to allow communication between a client device and a server device. The API may be provided by the server in order to offer a medium for communication between the client and server. In this manner, using an API or other integration arrangements, external processes—such as processes running on web pages—may be able to access server systems and, if available, obtain a validation certificate for a user.

Figure 1:
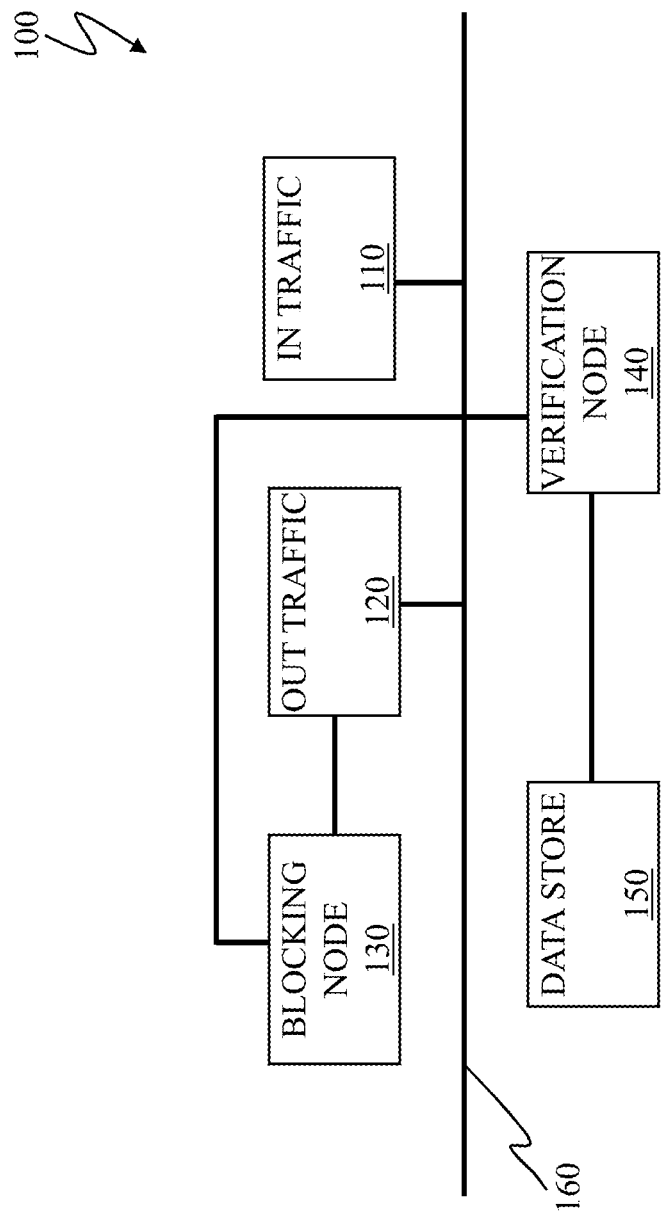
FIG. 1 is a functional block diagram depicting an exemplary embodiment of a validation computing system.

FIG. 1 depicts an exemplary embodiment of a validation computing system 100 comprising a first connection point, e.g., a node for input traffic 110, and a second connection point, e.g., a node for output traffic 120. In some embodiments, a network node may be an active electronic device attached to a network environment, capable of sending, receiving, and/or forwarding information over a communication channel 160. For example, a communication channel may be established, via a communicative association, between a first device and a second device. In this example, a communication channel between the devices may, for example, facilitate the sharing of information data. Optionally, communication channels may be in the form of physical transmission medium, i.e., a wired communication channel; logical connection over a multiplexed medium, i.e., a radio communication channel or encapsulated packet payload or over virtual private network (VPN); and/or non-physical transmission medium, i.e., a dedicated wireless communication channel.

The information data being transmitted may be received from a source, for example, the internet, where the validation computing system 100 may then act as a validator for the received data, i.e., packets. In one embodiment, a verification node 140 may determine whether the packet is a packet sent after a verification process, where the determination may be based on a set of rules. The verification node 140 may further communicate with a data store 150, e.g., a database, where the database may perform the verification process by comparing the received data, i.e., data packets comprising a key, with a previously sent key. In one embodiment, the verification node 140 may determine whether the key received matches the one previously generated and sent out. The determination of whether a match exists may be done via a device kernel and network stack, and may be indicated by a flag. If the key is determined to be the one expected, that may then trigger the execution of establishing a validated node. If the key is determined to be different than the one expected, it may then trigger the execution of the rejection of the node. Additionally, an optional blocking node 130 may be present in the validation computing system 100 so that the verification node 140 may then communicate the determined results to the blocking node 130 which may then prevent the set of packets from being sent out into the network. Optionally, the blocking node 130 may, after a predetermined number of failed attempts, stop allowing access to the node; and trigger the execution of the rejection of the node.

It may well be understood that in a computer networked environment comprising a plurality of networked processing nodes, a first computing device may host a virtual network computing server that may be connected to a second computing device which may host a virtual network computing server. The networked environment may be a collection of client and server nodes having a need for user verification where the environment may contain user accounts and security information for resources in that network. In some embodiments, a server may be employed to manage the verification security-related aspects, i.e., interactions and administration, between a client user and a network. Optionally, the first computing device may communicate with the second computing device via an authentication process. The second computing device may reside in a network, where the network may comprise servers and clients, for example, implemented as part of a wide area network (WAN). Optionally, a second computing device may reside in a network where the nodes may share physical proximity on a local area network (LAN).

In some embodiments, the validation may be performed by both the client and the server. That is, the client and server may, either individually or in collaboration with each other, execute the verification steps of validating the response from the user. Alternatively, the validation computing system may function in a manner where the server is in communication with the client and controls the validation process. In this alternate embodiment, the server performs the validation by executing a series of verification steps and provides the response to the client. Additionally, the server may maintain a timer so as to determine when a timeout might occur where the client is waiting for the user to enter an input and has not responded in a predetermined time interval, for example, number of minutes. In another embodiment, the server or client may keep track of how fast or quickly the user, at the client, is selecting answers to the question or challenge and in turn the responses being generated and received by the validation computing system. This feature may be necessary because some bots may respond too fast, i.e., short time intervals, to the question or challenge and therefore it may indicate that the user is not a human.

Figure 2:
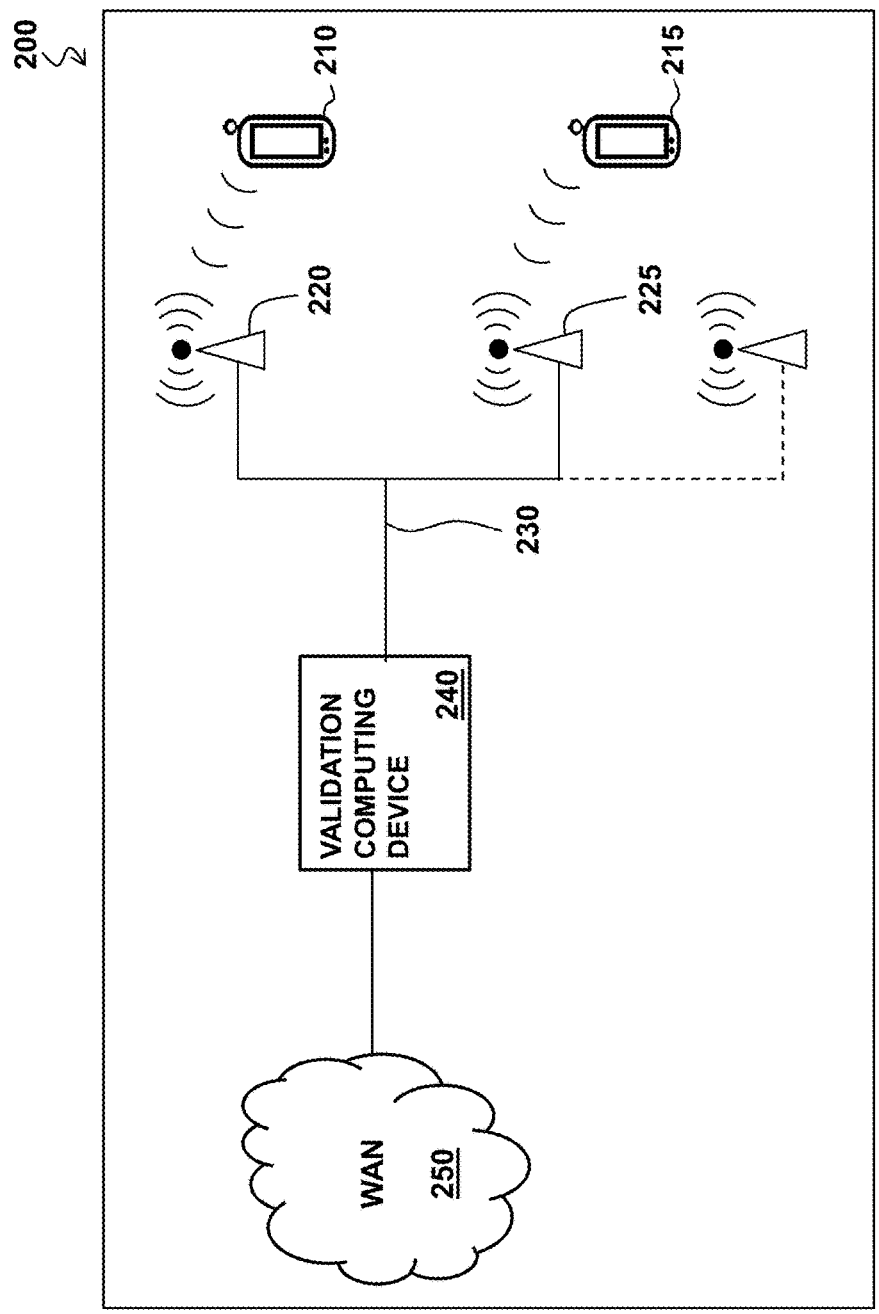
FIG. 2 depicts an exemplary embodiment of a validation computing system that includes a set of mobile devices.

FIG. 2 depicts an exemplary embodiment of a validation computing system 200 that includes a set of mobile devices 210,215, a plurality of WLAN devices 220,225, a validation computing device 240, and a WAN 250 that may provide access to the Internet, where the validation computing device 240 may act as the server and the mobile devices 210,215 may be operably connected to the validation computing device 240 and the WAN 250. The mobile devices 210,215 may be used as a client for verification of whether a user using the mobile device and wanting access to an API or website, is verified to be an authorized user, i.e., a human. In one embodiment, the validation computing device 240 may generate a key, i.e., answer to a question of a challenge-response verification scheme, or optionally the validation computing device 240 may generate and store the key and only provide the question to the mobile devices 210,215. In this embodiment, the validation computing device 240 may then receive the answer or key from the mobile devices and validate whether it is indeed the correct key. In one embodiment, the mobile devices 210,215 may be in communication with the validation computing device 240 via an API communication medium. In some embodiments, network connection and support equipment may integrate the system with a Local Area Network (LAN). Optionally, a hypertext transfer protocol (HTTP) may be used in establishing a connection and, for example, an HTTP request and an optional HTTP response, may be used to establish the connection. In yet another embodiment, the validation computing device may execute a set of one or more applications via an operating system (OS) that may be running on the device.

Figure 3:
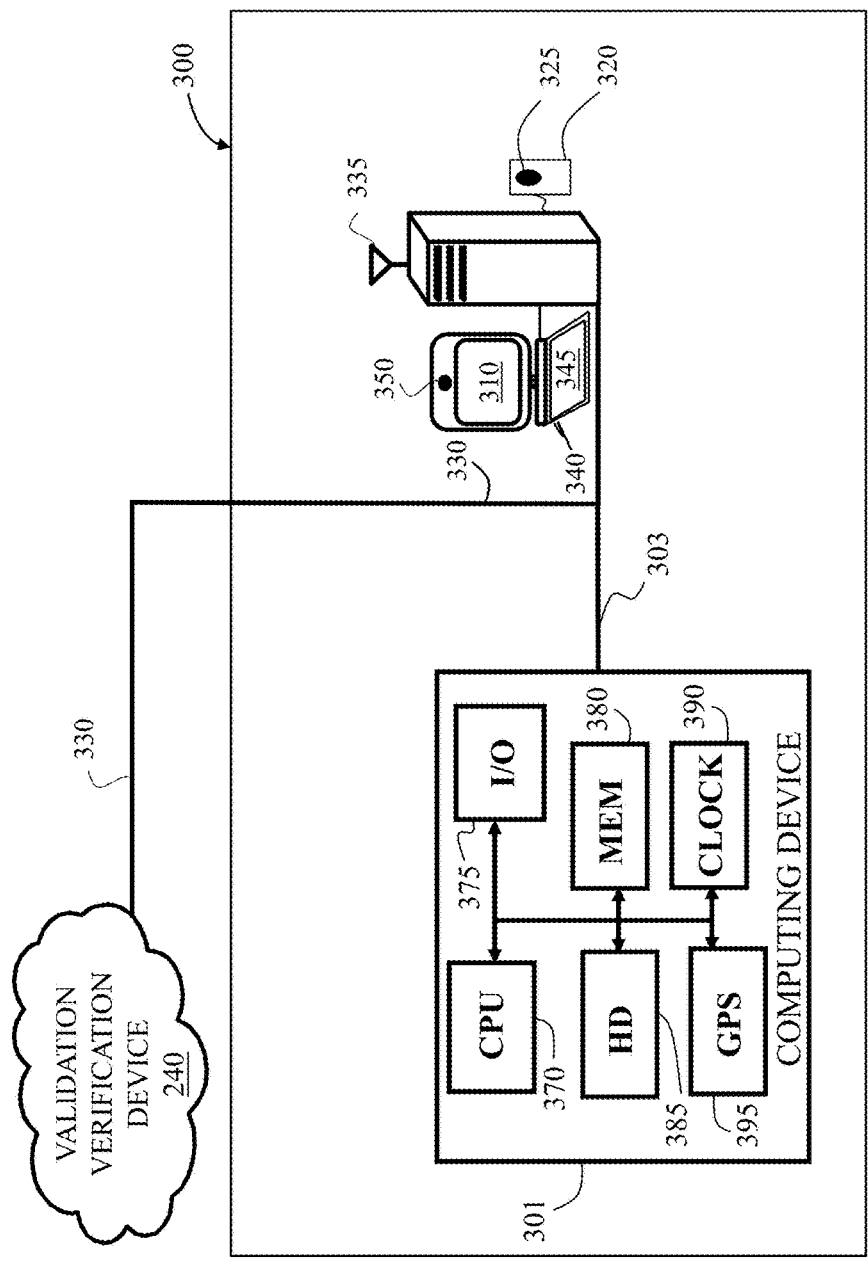
FIG. 3 depicts embodiments of the validation computing system that includes a form of a user input interaction display on a user operated device.

FIG. 3 depicts embodiments of the validation computing system that may include a form of a user input interaction display on a user operated device. One embodiment of the user operated device may provide a computing device where the computing device may comprise a visual display interface 310, an auditory interface 320, a communication interface 330, a user interface 340, an electromagnetic radiation responsive component 350, and a validation verification controller 301. In some embodiments, the visual display interface 310 may be configured to support the emission of electromagnetic radiation. Although it is contemplated that the visual display interface 310 may emit throughout the entire visible spectrum of approximately 400 nm to 700 nm, other embodiments may include a monochrome visual display interface 310 displaying in a much narrower range and, optionally not emitting electromagnetic radiation but rather reflecting incident radiation. In the non-emitting embodiment, the visual display interface 310 may be either full color, monochromatic, or something less than full color but more than monochromatic. Specifically, the visual display interface 310 may be limited to black and white, black, gray, and white, black and green, or other limited colors.

In one embodiment, the communication interface 330 may be configured to transmit and receive electronic signals. This includes signals from a wire or wireless source, for example, wireless source to a wireless communication interface 335. In some embodiments the user interface 340 may include a tactile responsive component 345. In one embodiment this may be a standard keyboard, and/or pointer-mouse system and/or a touch screen 345. The exemplary embodiment may be configured to receive and transmit signals, including user provided data via the display interface which also support touch screen input capability. In one embodiment, the computing device 300 may include a central processing unit (CPU), e.g., a processor 370, where the processor 370 may be configured to undertake a plurality of operations, as discussed herein, including signal processing and execution of instructions derived from the signal processor. Additionally, embodiments may include an addressable memory 380, for example, read only memory (ROM) or random access memory (RAM), a data store 385, a time measuring device 390, and an input/output interface 375. In one exemplary embodiment, the general handling of data, processing of data, and communication and display of data may be handled at the CPU level of the computing device by an operating system. The user computing device 300, via the validation verification controller 301, may be in communication with the validation computing device (FIG. 2, 240) through the communication medium 330. Accordingly, the user computing device 300 may transmit and receive validation related data so as to determine whether the user operating the device is a human or a bot.

Figure 4A:
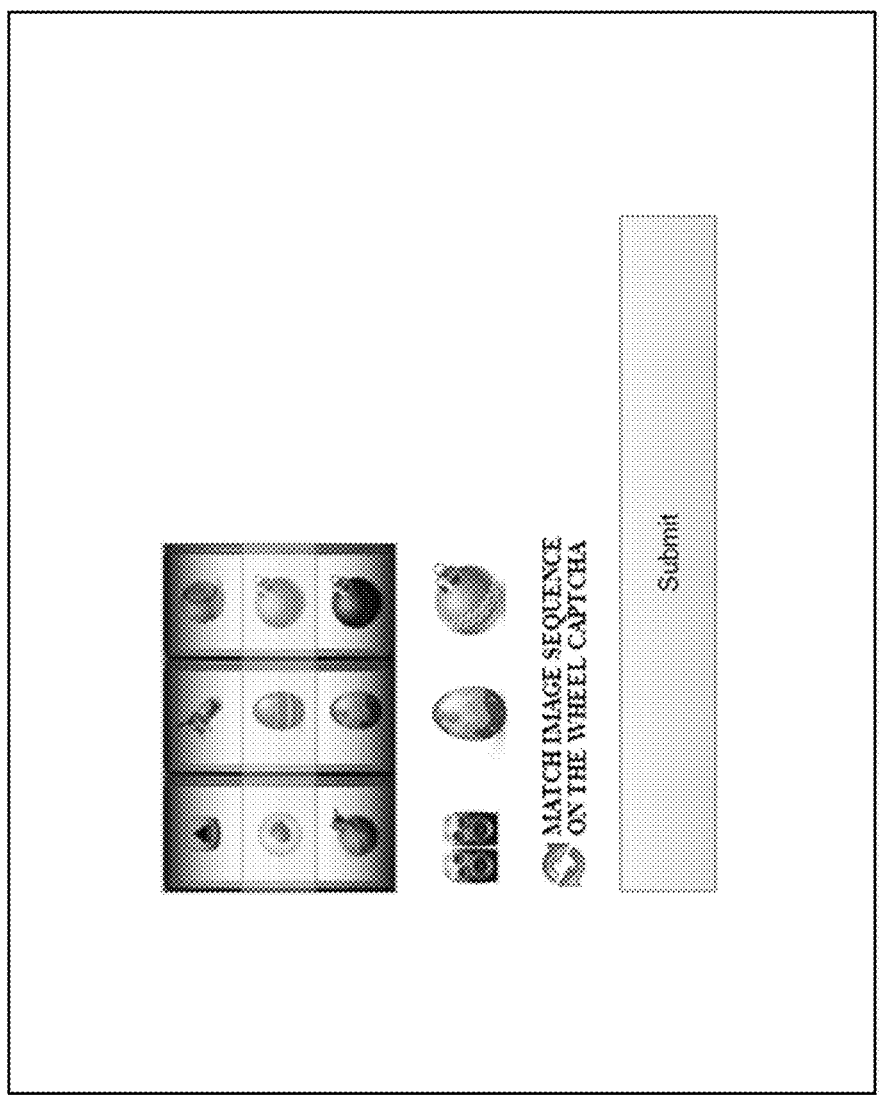
FIGS. 4A-B depict an exemplary display interface rendering showing a number of shapes in a field to be matched up.
Figure 4B:
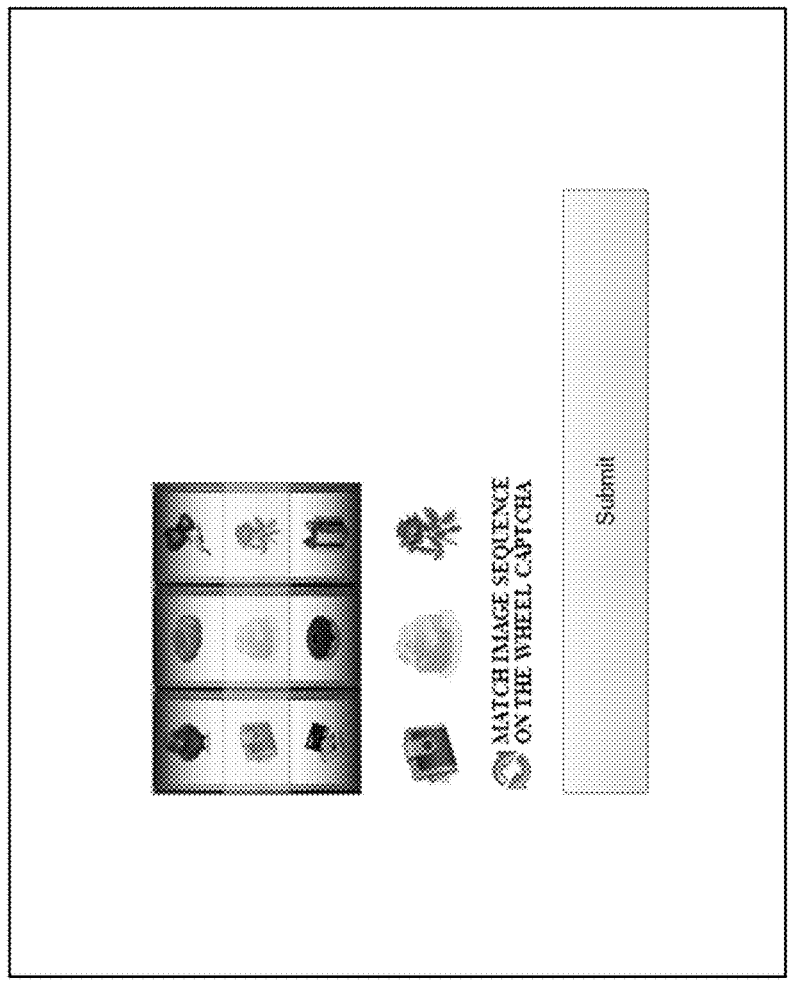

In one embodiment of the validation computing system, validation data may comprise a series of symbols, i.e., shapes, patterns, designs, motifs, images, illustrations, graphics, or geometrical figures, where the user is required to align the symbols in a series according to a provided and predetermined template, for example, a stencil, pattern, or overlay. Alternatively, multiple images may be overlaid on top of each other and the user asked to select the ones that match. FIGS. 4A-B depict an exemplary display interface rendering which shows a number of shapes and or words/numbers in a field where the user is asked to arrange the three or more reels by spinning them into the correct order so as to mimic the requested order and arrangement. In some embodiments, the three or more spinning reels may contain a total of five symbols however any combination of spinning wheels and total number of symbols may be utilized, as it is understood by one of ordinary skill in the art that the more symbols that are used the more combinations are available for the validation process. The exemplary embodiments illustrate that the user need not necessarily have to read the words or symbols on the reels but that they need to be able to match them together by, for example, using the touch screen of a mobile device, to scroll through the symbols in order to find the correct combination. It is emphasized that bots may not have the ability to scroll through the symbols as they are to be done by use of touch or the mouse. In order to be able to put the symbols in the correct arrangement as the template displayed, the user need not necessarily understand what they are providing for the validation or verification process, however, once they visually identify that the symbols match the ones presented, they may now press "submit" in order to complete the verification and await confirmation as to whether they have the correct combination. FIG. 4B depicts a display interface after a user has arranged the symbols in accordance with the requested match and may now press "Submit" in order to be verified as a human user and not a bot.

In another embodiment, the user may not necessarily need to match each symbol with the presented template, but they may be asked to match up the symbols according to a "theme." That is, they are presented with a theme, i.e., subject, topic, or subject matter, and be asked to select the symbols according to that theme. In this embodiment, the ability of a bot to guess or crack the code in order to be verified as a validated user is virtually nullified. Typically, only a human being may associate a symbol with a specific theme. For example: "playing" may only be associated with a tricycle, a ball, a piano, an amusement park or any recreational activity. A human being may recognize that playing is indeed the act of engaging in an activity for enjoyment and recreation rather than a serious or practical purpose and thereby determine which symbols fit that category. The association of symbols and themes may then be applied to other such validations and or combined with a set of predetermined arrangement thereby creating a unique key and answer to the question posed by the verification computing device. One exemplary embodiment may display an interface where the user has matched up a clock, a bomb, a key, and a car so as to depict a theme from the series "24."

Figure 5:
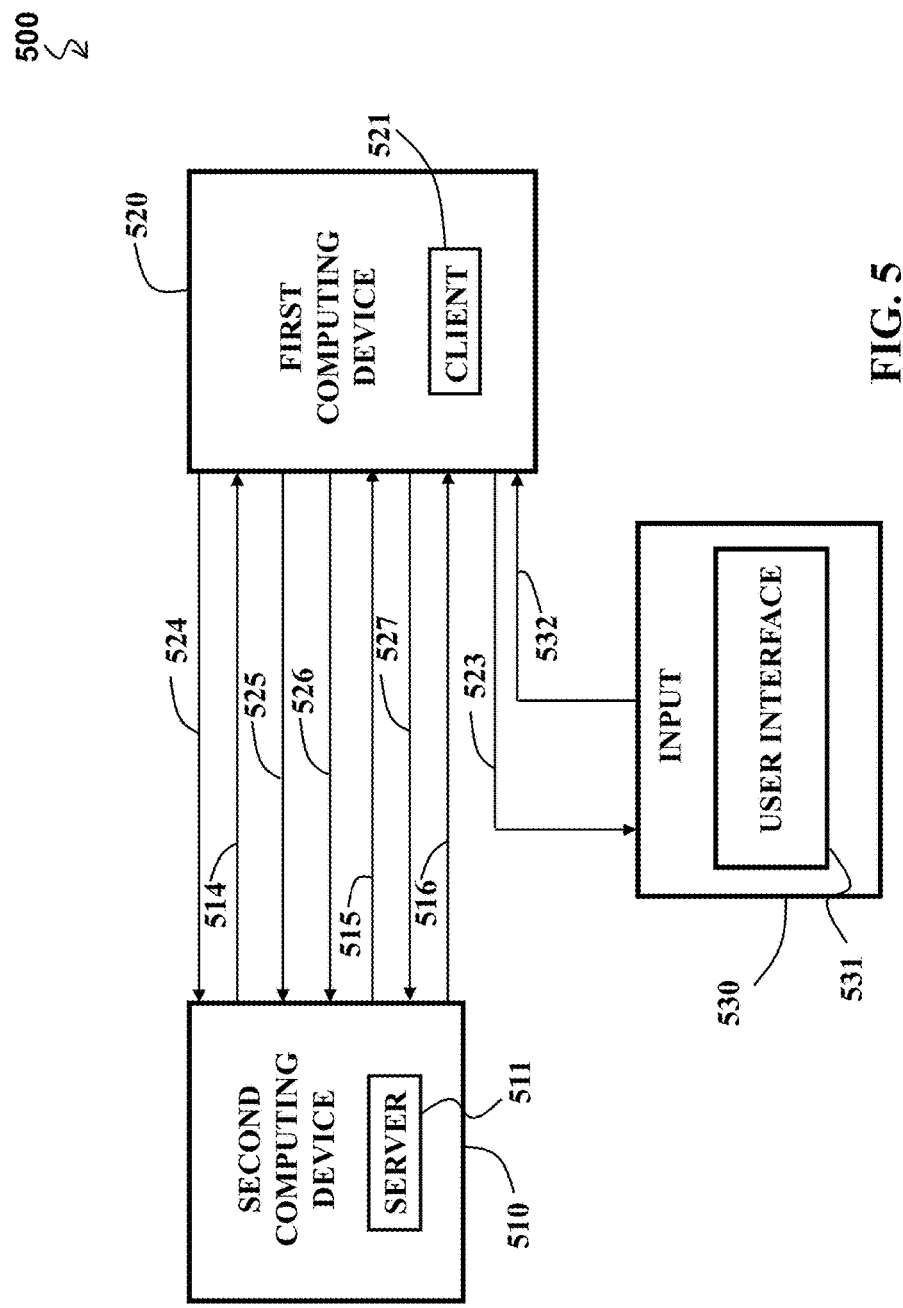
FIG. 5 depicts a client/server system where the client and server are in communication with each other.

FIG. 5 depicts a client/server system 500 where the client and server are in communication with each other. In this embodiment, the first computing device 520, e.g., hosting a client 521, and the second computing device 510, e.g., hosting a server 511, are depicted as communicating with each other. Additionally, the first computing device 520 may comprise a user interface 531 to provide user input 532 to the first computing device 520. In this exemplary embodiment, the client 521 may initiate a request 524 to the server 511 requesting to be validated via a verification process. The request 524 may be sent based on an input form loading on a web page or website upon initiation by the user, where the initiation may be via entering an Internet address—also known as a uniform resource locator (URL)—of the website. In one exemplary embodiment, the website may be hosted on a separate web server (host) than the client 521 and server 511, and may be accessible via a network, e.g., the Internet or a private local area network, through the URL. The verification process may include the client requesting/asking the server for a unique key.

The server 511 may then respond 514 by sending data, the data including a generated unique key, which may be generated via a randomization scheme, representing the symbols that are to be displayed on the display interface for each reel, for example, the symbols depicted in FIGS. 4A-B, to the client 521. The generated unique key may be sent to the client in randomized form where unique key is broken into different pieces of smaller length or bites, and randomly ordered or rearranged in the form of a full length key. Optionally, the server may respond 514 by sending a code to unlock a predetermined set of symbols already residing on the client. Additionally, the server 511 may include as part of the response, a temporary key where the validation computing system may employ a temporary key mechanism in which the temporary key has a shorter length, in bits, than the randomly generated and unique key. That is, the temporary key may operate to minimize the processing steps of the server 511 in having to locate a match in the table of generated unique keys. The temporary key may be passed as an argument from the server 511 to the client 521 in response to the initial request by the client 521. Accordingly, the server 511, via an optional data store, may manage a table which stores: a status flag, a temporary key, and a unique key; thereby speeding up the search, irrespective of the search algorithm being used for finding a unique key item with the specified properties among the collection of generated unique keys stored and managed by the server 511.

The client 521 may also then have the option of sending information to the server 511, regarding the display interface's capabilities 525, for example, touch screen or one with a tactile keyboard or mouse, along with other relevant user information to the server 511. The client 521, upon receiving user input 532 information from the user interface 531, once a submit function has been invoked, may send data 526, based on the temporary key and a newly created key, to the server 511 for verification. The newly created key may be based on the input and arrangement of symbols on the client 521—more specifically, the user interface 531 of the client—and sent to the server 511 for authentication. That is, the client 521 may at that point transmit data 526 associated with the template of symbols and a temporary key to the server 511, e.g., via pushing the data or providing it via an API. The server 511 may in some embodiments keep the key and receive the answer from the client 521; at which point the server may then perform the steps of matching the received answer with the key or predetermined answer.

In one embodiment of the validation computing system, the system may utilize a key status flag which is generated by the server 511 and maintained in a table or data store in order to track whether a temporary key has already been used. By providing this check, the system may safeguard against a user, whether authorized or unauthorized, to reuse a key that may have been cashed in memory. Accordingly, the validation computing system may first check the key status to determine whether the key has previously been used by reading a status flag, for example, a bit having only one of two values, where the flag has two values interpreted as logical values: true/false or yes/no. Extra processing may be prevented by first checking the flag and not proceeding with authenticating a key if it is determines that the key has already been used based on the status flag check.

The server 511 may determine whether a received temporary key—as part of the data 526—from the client 521, should go through the authentication process, and if so authentic the temporary key based on the following steps: a) determine whether status flag is set to false or no, indicating it has not been used yet; b) determine whether the temporary key, comprised of a smaller number of characters as compared to the unique key, exists in the table; and c) determine whether the unique key matches the entry and authenticating the user. The temporary key may be considered a token for purposes of locating the unique key in the table, for example, a hash table or hash map, to be used as a data structure in order to implement an associative array, or a structure that may map tokens to keys; thereby reducing processing time and operate dynamically to reduce lag time with the authentication process.

In some embodiments, the client 521 may comprise an input component 530 that includes a user interface 531. The user interface 531 may send information collected 532 as input by the user to the client 521, once the submit button is engaged, and the client 521 may then perform a verification via a validation process on the client or by sending the information to the server (not shown) for validation and in return send the user to the next step 523 and a confirmation to be displayed to the user. The validation computing system may provide an added step for security and verification by offering an API call, using any desired protocol, to the web domain. For example, using Hypertext Transfer Protocol (HTTP), which may optionally employ encryption (HTTP Secure, HTTPS) the web server or web admin—whether residing on the client 521 or hosted separately—may then provide security and privacy for the user of the webpage by independently making an API call to the server 511. The API call may transmit to the server 511 a query 527 asking whether the key has been used and authenticated. Thereby, the authentication provided by the server 511 previously may be independently verified before the web server proceeds to processing the form and inputted information from the user. In one embodiment of the web server with additional security steps, the server 511 may maintain an additional flag for checking whether a key has been authenticated previously. The server 511 may then respond 516 with a confirmation to the web server thereby providing an autonomous authentication system. This flag may be different than the one used to determine whether a unique key has been used previously.

Figure 6:
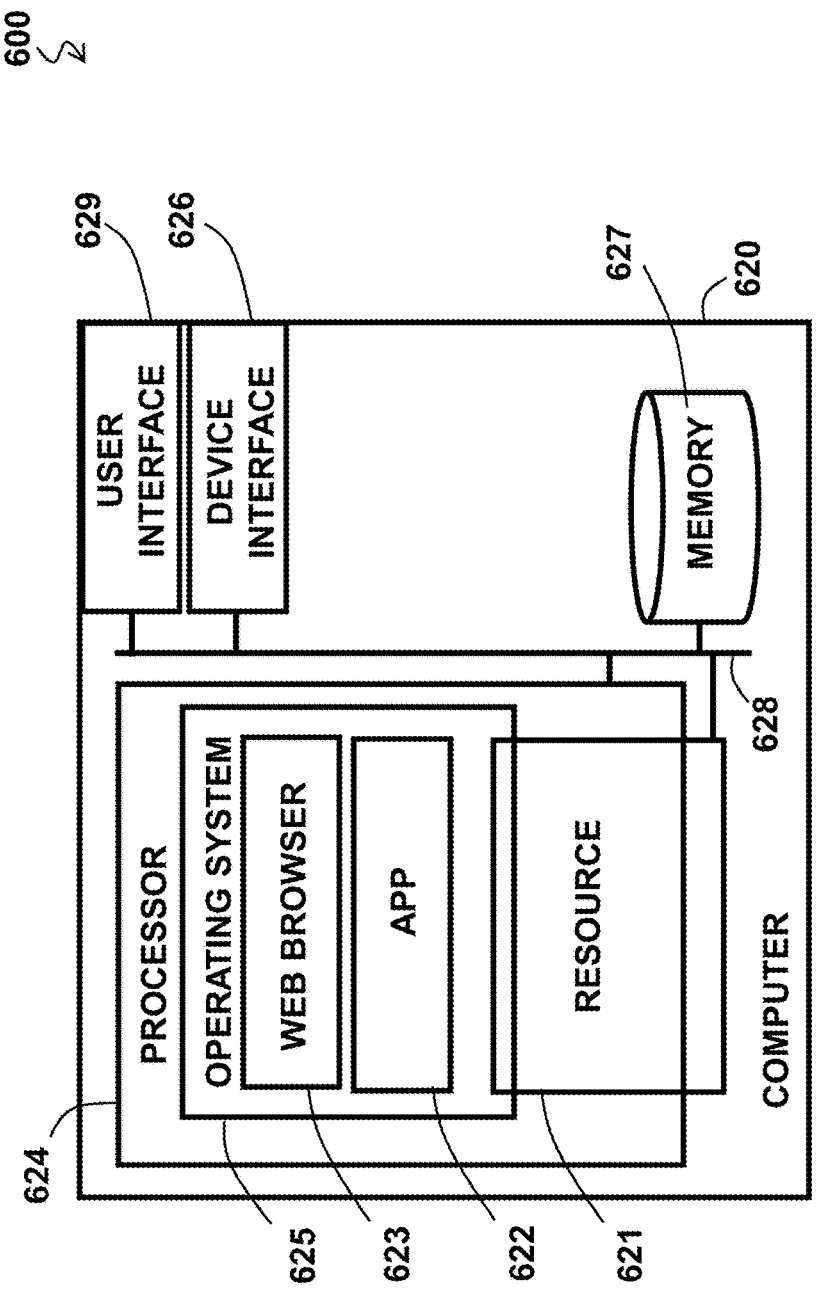
FIG. 6 illustrates an exemplary top level functional block diagram of a validation computing device embodiment.

FIG. 6 illustrates an exemplary top level functional block diagram of a validation computing device embodiment. The exemplary operating environment is shown as a computing device 620 comprising a processor 624, such as a central processing unit (CPU), a storage, such as a lookup table 627, e.g., an array, an external device interface 626, e.g., an optional universal serial bus port and related processing, and/or an Ethernet port and related processing, an output device interface 623, e.g., a web browser, a receiver, e.g., antenna 630, and an optional user interface 629, e.g., an array of status lights and one or more toggle switches, and/or a display, and/or a keyboard and/or a pointer-mouse system and/or a touch screen. Optionally, the computing device may comprise an addressable memory where the addressable memory may, for example, be: flash memory, eprom, and/or a disk drive or other hard drive. These elements may be in communication with one another via a data bus 628, via an operating system 625 such as a real-time operating system and/or an operating system, supporting a web browser and applications, the processor 624 may be configured to execute steps of a process, e.g., executing a rule set, according to the exemplary embodiments described above. Embodiments depict an application (app) 622 running on the operating system where the application generates a key and keeps track of the attempts and requests in the verification scheme. A set of resources 621 may presently be available to keep track of attempts per client and provide the tools for validating the requests for each client.

Figures 7A, 7B:
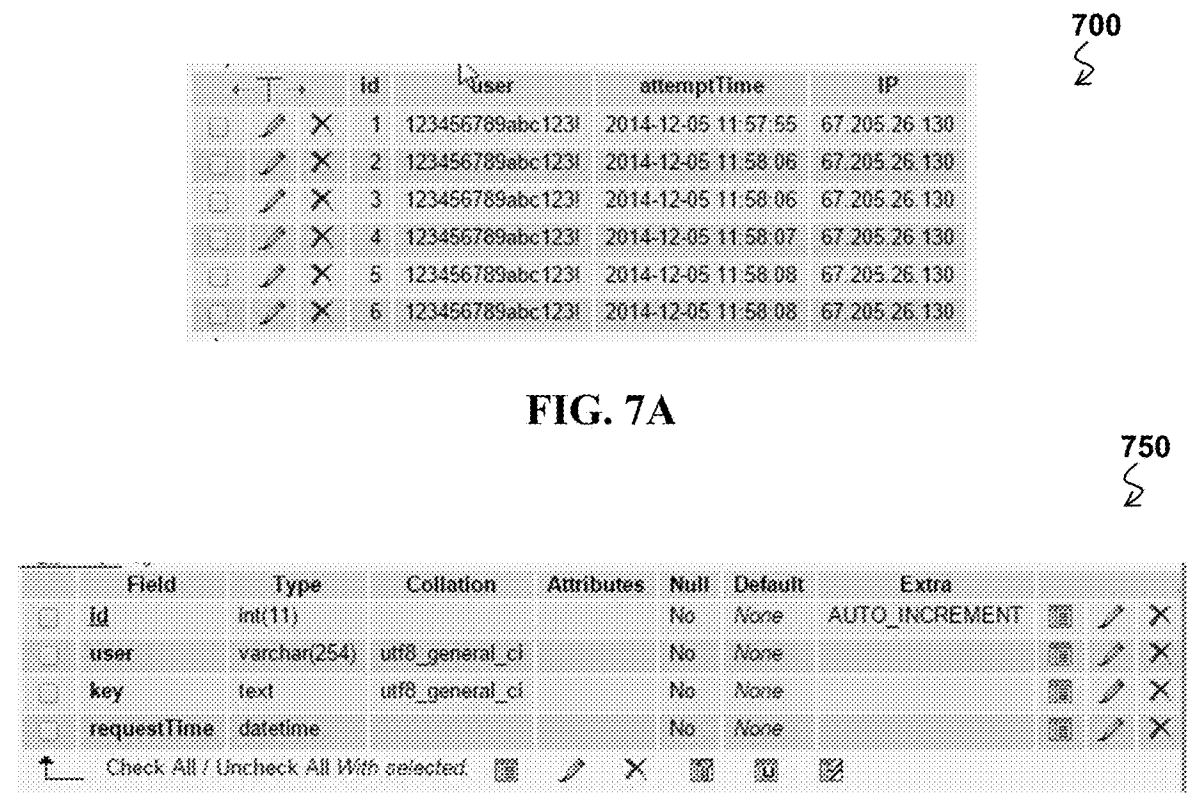

In one exemplary validation computing system embodiment, a client API may generate a request to the server, however, if too many attempts are made, the client may be logged out by the server. The validation computing system may then implement a timer or counter to allow the client to try again after a predefined amount of time—subsequent to the unsuccessful attempts—has passed. The server may capture all the received requests and keep track of them on an individual basis for each associated client. FIG. 7A depicts an exemplary table 700 of attempts for clients, e.g., users, and an associated attempt time, where for each user an Internet Protocol (IP) address is also stored, for example, in a data store. The attempts table 700 may be stored separately from an exemplary table of requests 750 as depicted in FIG. 7B where each request may be for a key from the server to be used by the validation computing system. The requests table 750 may include a reference to the field, type, collation, and attributes of the request.

Embodiments may include an exemplary method of implementation of a validation computing system 800, as illustrated in a top-level flowchart of FIG. 8. The exemplary steps of the system and associated computing devices may comprise the following steps: (a) loading, by a client device, a webpage based on a user request to initiate and retrieve a webpage from a web host (step 810); (b) sending, by the client device, the request to an application server via an application programming interface (API) (step 820); (c) generating, by the application server, a random unique key associated with the received request (step 830); (d) determining, by the application server, a temporary key based on the generated unique key, where the temporary key comprises a smaller number of bites than the generated unique key and is stored in a corresponding cache table (step 840); (e) sending, by the application server, the determined temporary key and the generated random unique key to the client device (step 850); (f) determining, by the client device, an inputted key based on a received configuration of symbols from the user (step 860); (g) sending, by the client device, the inputted key and temporary key to the application server for validations (step 870); and (h) validating, by the application server, the received inputted key and the received temporary key by authenticating the inputted key based on the unique key, where the unique is determined based on looking up the temporary key (step 880). Optionally, associating the unique key with the temporary key based on using the temporary key as a lookup table hash function or attributes to locate the unique key in the cache table.

Additionally, exemplary method of implementation of a validation computing system may further comprise the steps of: transmitting, by the client device, the validation related information to a web admin indicating whether the validating step was successful or not, where the validation related information comprises a flag indicating success or failure and the temporary key. The web admin may then make an API call to the application server and send the temporary key and signal that the key was authenticated. The application server may then confirm that the particular key was indeed authenticated previously and respond with a confirmation to the web admin communicating that the entire process had been successful. These additional steps provide an extra layer of security for the web admin thereby strengthening security and defense against bots.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated. It is contemplated that various combinations and/or sub-combinations of the specific features, systems, methods, and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A device comprising:
   a processor and an addressable memory, the processor configured to:
   receive a request from a client for authentication and a key;
   generate a first unique key associated with the request received from the client;
   generate a second key, wherein the second key has a data length that is less than a data length of the first unique key, and wherein the data length is measured in bits;
   associate the second key with the first unique key;
   determine a third key based on the first unique key broken into different pieces, each piece having a length smaller than the first unique key, and randomly ordered in the form of a full length key;
   send the determined third key and the second key to the client based on the received request;
   receive a response comprising: a fourth unique key and the second key from the client, wherein the received fourth key is generated based on user input at the client;
   perform steps of authenticating the received fourth key with the first unique key, wherein the steps of authenticating the received fourth key comprise:
   retrieve the first unique key via a lookup function using the received second key and based on a successful validation of the second key; and
   if the received fourth key matches the retrieved first unique key, then authenticate the client for the received request;
   if the received fourth key does not match the retrieved first unique key, then reject the received request from the client.

2. The device of claim 1 wherein the request further comprises information regarding the display interface capabilities of the client.

3. The device of claim 2 wherein the information regarding the display interface capabilities of the client comprises at least one of: whether the display is a touch screen, whether the display requires a tactile keyboard, and whether the display requires a mouse for input.

4. The device of claim 1 wherein the data length of the first unique key and the second key are measured in bits.

5. The device of claim 1 wherein the response received from the client is further based on user input received from a user interface device.

6. The device of claim 5 wherein the user interface device comprises a touch screen input module.

7. The device of claim 1 wherein the processor is further configured to:
   perform steps of authenticating the received response with the unique key, wherein the steps of authenticating the received response comprise:
   if the received response matches the unique key, then validate the client for the received request;
   wherein the validating the client is further based on receiving a request from a webhost to verify that the client has already been authenticated via authenticating the received response with the unique key.

8. The device of claim 7 wherein the receiving a request from the webhost to verify that the client has already been authenticated further comprises checking a flag previously set and associated with the unique key to indicate a prior successful authentication.

9. The device of claim 1 wherein the first unique key is generated based on a randomization scheme.

10. The device of claim 1 wherein the user interface device comprises at least one of:
    an electromechanical radiation responsive component; and
    an electromagnetic radiation responsive component.

11. The device of claim 1 wherein the determined third key is sent to the client based on the received request via transmitting different pieces of the generated first unique key in a randomized order and combined with randomly generated pieces to form a longer length key than the first unique key.

12. The device of claim 1 wherein the validation of the second key is to validate the received second key via checking a status flag associated with the second key to determine whether the received second key has not been previously used.

13. The device of claim 1 wherein the received fourth key is generated based on user input at the client based on arrangement of symbols on the client.

14. A system comprising:
    a first computing device having a processor and an addressable memory, a visual display interface; and a user interface comprising at least one of:
    a tactile responsive component;
    an electromechanical radiation responsive component; and
    an electromagnetic radiation responsive component;
    a second computing device having a processor and an addressable memory; and
    a third computing device having a processor and an addressable memory;
    wherein each computing device is in communication with the other computing devices via a plurality of communication channels;
    wherein the first computing device is configured to:
    load a form comprising fields requiring input from a user;
    transmit, to the second computing device, a request for validation of the user;
    wherein the second computing device is configured to:
    receive the request for validation of the user from the first computing device;
    generate a first unique key;
    generate a second unique key, wherein the second unique key has a data length that is less than a data length of the first unique key, and wherein the data length is measured in bits; and
    transmit the generated first unique key and the generated second unique key, to the first computing device, wherein the transmission of the first unique key is via transmitting pieces of the generated first unique key in randomized order;
    wherein the first computing device is further configured to:
    determine a user generated response key based on user input received from the user interface; and transmit the determined user generated response key and the received second unique key to the second computing device; and wherein the second computing device is further configured to:

authenticate the user based on comparing the received user generated response key with the generated first unique key; wherein the comparison is further based on searching for the generated first unique key in a data store via using the second unique key as a lookup token; and determine whether the received user generated response key matches the generated first unique key, thereby providing an autonomous authentication system to verify the user.

15. The system of claim 14, wherein the second computing device is further configured to:

send the determination of whether the received user generated response key matches the generated first unique key to the first computing device;

wherein the third computing device, via a webhost, is configured to:

receive from the first computing device the determination as to whether the received user generated response key matches the generated first unique key;

validate the authentication wherein the validation is via transmission, to the second computing device, the user generated response key and indicate that it was previously authenticated;

determine whether the authentication is validated based on receiving a flag from the second computing device, in response to the transmission indicating a successful transaction.

16. The system of claim 14 wherein the user interface comprises at least one of:

an electromechanical radiation responsive component; and an electromagnetic radiation responsive component.

* * * * *